United States Patent
Yu et al.

(10) Patent No.: US 7,588,138 B2
(45) Date of Patent: Sep. 15, 2009

(54) DEVICE HANDLING SYSTEM

(75) Inventors: Yongling Yu, Singapore (SG); Kahteck Kuan, Singapore (SG); Hwaliang Ng, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 32 days.

(21) Appl. No.: 11/855,854

(22) Filed: Sep. 14, 2007

(65) Prior Publication Data

US 2009/0074553 A1 Mar. 19, 2009

(51) Int. Cl.
*B65G 13/00* (2006.01)
(52) U.S. Cl. ................................ 198/782; 198/780
(58) Field of Classification Search ............. 198/782, 198/783
See application file for complete search history.

(56) References Cited

U.S. PATENT DOCUMENTS

| | | | | |
|---|---|---|---|---|
| 2,937,093 A | * | 5/1960 | Gorman et al. | 426/663 |
| 4,505,381 A | * | 3/1985 | Major | 198/781.02 |
| 4,878,578 A | | 11/1989 | Brouwer | |
| 5,904,239 A | * | 5/1999 | Narisawa | 198/783 |
| 6,047,812 A | * | 4/2000 | Horn et al. | 198/781.06 |
| 6,460,683 B1 | * | 10/2002 | Pfeiffer | 198/460.1 |
| 6,959,804 B2 | * | 11/2005 | Helgerson et al. | 198/805 |
| 7,175,018 B2 | * | 2/2007 | Helgerson et al. | 198/780 |
| 2005/0115353 A1 | | 6/2005 | Schmidtbleicher et al. | |
| 2006/0278497 A1 | | 12/2006 | White et al. | |
| 2006/0280588 A1 | | 12/2006 | Blonigan et al. | |
| 2006/0283688 A1 | | 12/2006 | Blonigan et al. | |

* cited by examiner

*Primary Examiner*—Mark A Deuble
(74) *Attorney, Agent, or Firm*—Fellers, Snider, et al.

(57) ABSTRACT

An apparatus and associated method for handling a device in a manner that enhances a self-purging efficiency with which debris in the device is ameliorated. The apparatus and associated method includes rocking the device along a rocker conveyor path defined by opposing rails supporting respective rows of cantilevered eccentric rollers, wherein the rollers supported by one rail of the opposing rails are clearingly disengaged from the rollers supported by the other rail of the opposing rails, and wherein the device is instantaneously supported by one or more of the rollers supported by the one rail and one or more of the rollers supported by the other rail.

18 Claims, 4 Drawing Sheets

DEVICE HANDLING SYSTEM

BACKGROUND

Manufacturing lines have generally evolved through the application of highly sophisticated automation devices and methods. Gains in productivity have been realized as past reliance on human judgment and manipulation is replaced by processor-driven systems. The repeatability of such systems enables the throughput velocity of components to be maximized.

Along with maximizing throughput, there has been a general trend toward performing both fabrication and testing operations at the point of final assembly, rather than building batches of subassemblies ahead of the time they are needed. By scheduling as many parts as possible to be ready "just in time" for final assembly, the utilization of all production equipment supporting final assembly is maximized.

However, these practices inevitably raise some problematic issues that cannot be ignored. For example, fabrication and assembly operations can create debris that, if not controlled, can damage sensitive components. With the continued demand for automated manufacturing lines having ever higher levels of throughput performance, there remains a continual need for improvements in the manner in which such debris is controlled. It is to the furthering of those efforts that the embodiments of the present invention are directed.

SUMMARY OF THE INVENTION

Embodiments of the present invention are directed to an apparatus and associated method for handling a device in a manner that enhances a self-purging efficiency with which the existence of debris in the device is ameliorated. The apparatus and associated method includes rocking the device along a rocker conveyor path that is defined by opposing rails supporting respective rows of cantilevered eccentric rollers. The rollers supported by one rail of the opposing rails are clearingly disengaged from the rollers supported by the other rail of the opposing rails. Thus, the device is instantaneously supported by one or more of the rollers supported by the one rail and one or more of the rollers supported by the other rail.

These and various other features and advantages which characterize the claimed embodiments will become apparent upon reading the following detailed description and upon reviewing the associated drawings.

DETAILED DESCRIPTION

Figure 1:
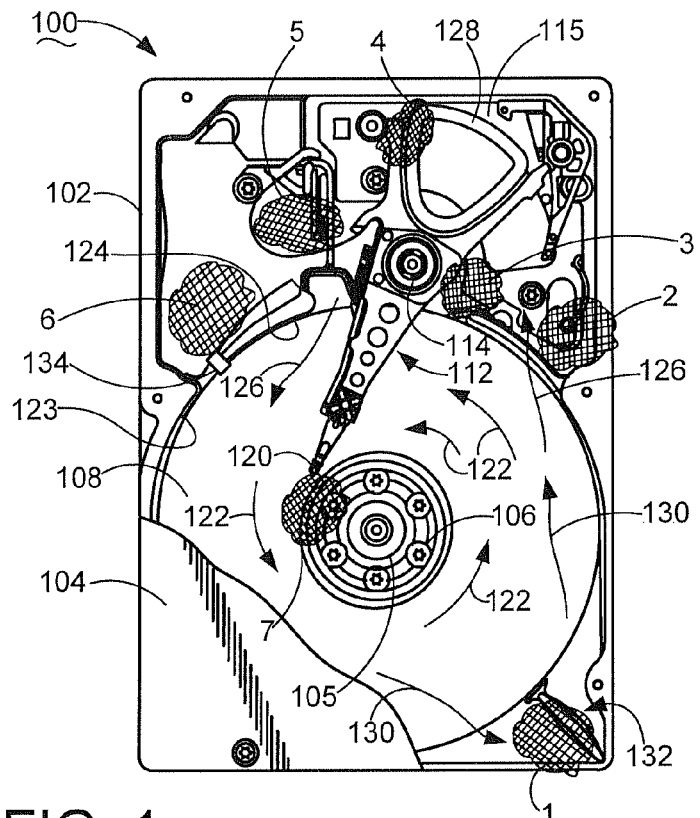
FIG. 1 is a plan view of an exemplary data storage device that is suitable for use in practicing the described embodiments.

Referring to the drawings in general, and more particularly to FIG. 1 that shows a plan view of a data storage device 100 (or "drive") that is suited for use in practicing embodiments of the present invention. The drive 100 generally includes a base 102 and a cover 104 (partially cutaway), which together provide an enclosure for a number of components. The components include a motor 105 to which one or more storage mediums 108 (or "discs") are fixed in rotation therewith. Adjacent the disc 108 is an actuator assembly 112 that is pivotable around a spindle bearing 114 by selectively energizing a voice coil motor ("VCM") 115.

The actuator assembly 112 operably positions heads 120 (or "transducers") at a distal end thereof in a data transfer relationship with each of opposing surfaces of the disc 108. The motor 105 spins the disc 108 (counterclockwise in FIG. 1) to create outwardly spiraling fluid currents (depicted by arrows 122) that impinge a bearing surface of each head 120 to fly them in close proximity to the disc 108. It will be noted that the base 102 defines an arcuate shroud 123 in a close mating relationship with the disc 108 edge in order to train the fluid currents in the spiral fashion for flying the heads 120. A gap in the shroud 123 downstream of the actuator assembly 112 is necessary in order to merge the actuator assembly 112 and the disc (or discs) 108. Once merged, however, a disc edge damper 124 is inserted in the gap to effectively extend the shroud 123 into that gap.

The shroud 123 is also discontinued upstream of the actuator assembly 112 in order to direct a portion of the fluid currents (depicted by arrow 126) over an electrical coil 128 of the VCM 115 in order to transfer heat away from it. The shroud 123 is also discontinued opposite the actuator assembly 112 in order to direct fluid currents (depicted by arrow 130) through a filter 132. Fluid borne debris are thus entrapped in the filter 132, preventing them from otherwise doing damage to components inside the enclosure. For instance, debris can damage sensitive printed circuit board components or precision bearing surfaces, or it can become wedged between the transducer 120 and the disc 108 causing the loss of stored data and/or damage to the transducer 120 and the disc 108.

Thus, it can be advantageous to spin the discs 108 for a while during drive 100 manufacturing in order to self-purge debris in the enclosure ("self-purging routine"). However, it will be appreciated that there are a number of obstacles within the enclosure that effectively block the flow of purging fluid currents, creating fluid current dead zones where debris is likely to accumulate. Debris can become lodged to these obstacles in the dead zones by static bonding. FIG. 1 depicts a number of shaded areas denoted 1-7, indicating locations in the drive 100 where dead zones can exist. However, the shaded areas 1-7 are merely illustrative and not limiting of where the dead zones can exist, as different designs and operating parameters produce different results.

The present embodiments are directed to agitating the drive 100 during manufacturing to effectively dislodge debris from these and other dead zones, making the self-purging routine more effective and efficient.

Figure 2:
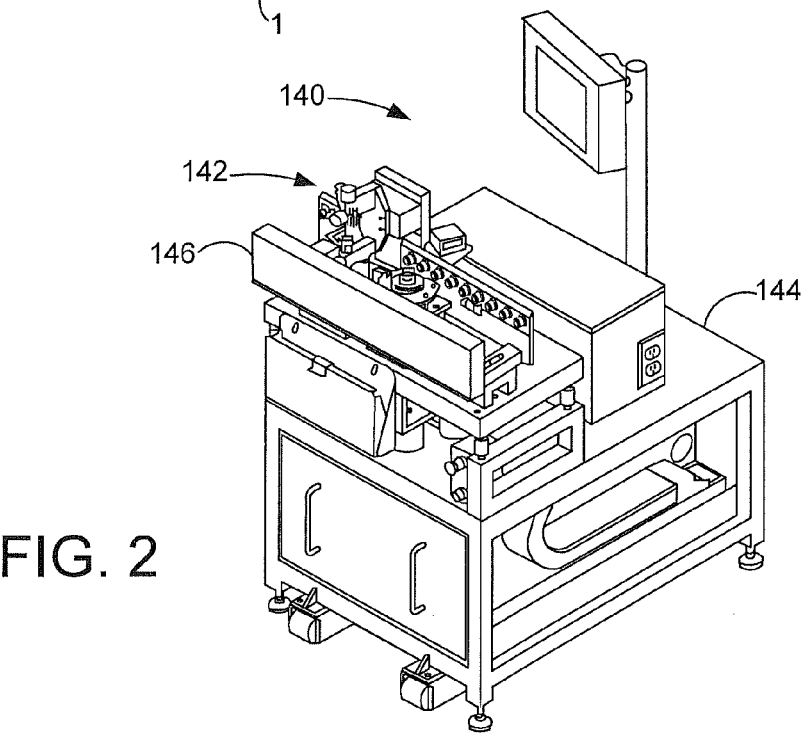
FIG. 2 is an isometric view of a manufacturing cell forming a part of a manufacturing system for assembling and testing the device of FIG. 1.

FIG. 2 depicts a machine cell 140 that is illustrative of an environment that is readily adaptable for using embodiments of the present invention. The cell 140 generally supports a tool arrangement 142 that performs manufacturing and/or assembly operations on an article presented to it. The cell 140 is illustrative of a modular approach wherein a plurality of such cells are joined together to form a manufacturing system, although the present embodiments are not so limited. Particularly, the cell 140 is built upon a frame 144 having rollers to facilitate moving cells into and out of a manufacturing system, or to rearrange the cells as is desired for running different articles down the system. Support mounts are extendible to operably lift the frame 144 off the rollers and to level the frame. A conveyor section 146 can be placed at a standardized elevation in each of adjacent cells to provide a continuous transport system for presenting the articles to each of the tools in the respective cells.

The illustrative cell 140 depicts a balance measurement station in a manufacturing line for producing drives 100, and is described in detail in U.S. Pat. No. 6,507,992 which is assigned to the present assignee. A pallet (not shown) supporting the drive 100 in its various stages of manufacture is transported down the conveyor 146. In this manner, the conveyor 146 acts as a handling apparatus for the drive 100 both within and between the various cells used in its manufacture. The present embodiments take advantage of the drive's 100 exposure to the handling apparatus as an opportunity to impart preselected vibration waveforms to effectively dislodge debris that may accumulate on components of the drive 100.

Figure 3:
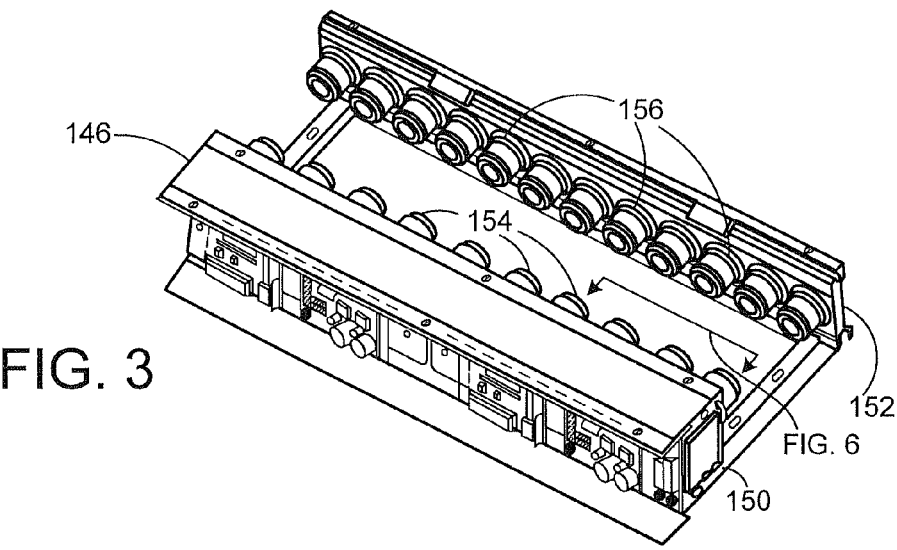
FIG. 3 is an isometric view of the conveyor portion of the cell of FIG. 2.

FIG. 3 is an isometric depiction of a portion of the conveyor 146 that is constructed in accordance with embodiments of the present invention. The conveyor 146 has opposing rails 150, 152 supporting respective rows of cantilevered eccentric rollers 154, 156 defining a rocker conveyor path for the drive 100. As best shown by the end view depicted in FIG. 4, the rollers 154 supported by the rail 150 are clearingly disengaged from the rollers 156 supported by the other rail 152. Accordingly, the drive 100 is instantaneously supported by one or more of each of the rollers 154, 156.

Figure 4:
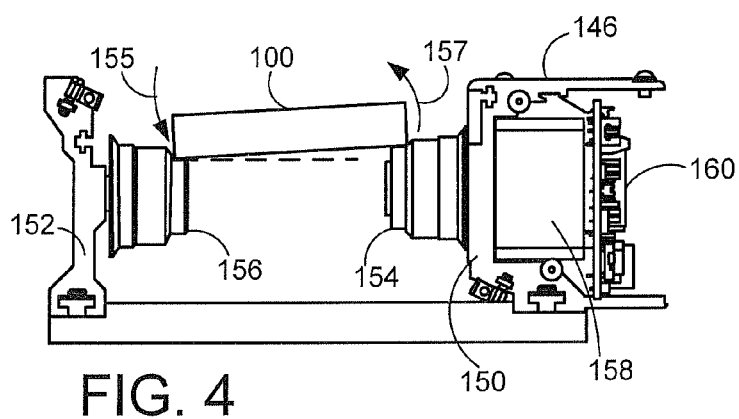
FIGS. 4 and 5 are end views of a rocker conveyor with eccentric rollers in accordance with the described embodiments.
Figure 5:
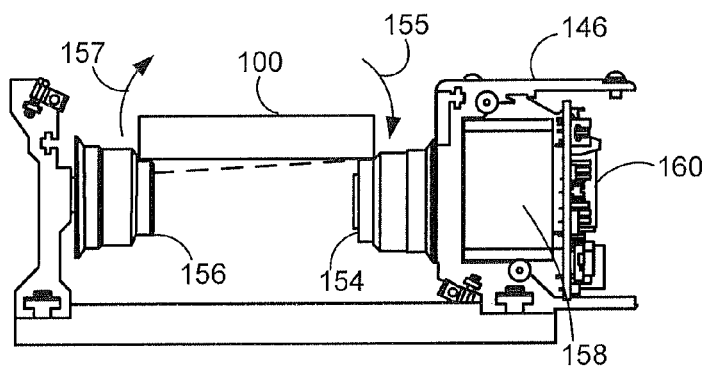

FIG. 4 depicts a particular rotation wherein the eccentric opposing rollers 154, 156 displace the drive 100 angularly in one direction in relation to the horizontal, which is depicted by the broken line. FIG. 5 depicts a subsequent rotation whereby the opposing eccentricities of the rollers 154, 156 displace the drive 100 in the opposite angular direction. In this manner, the eccentric rollers 154, 156 and the force of gravity impart opposing forces 155, 157 that continuously rock the drive 100 laterally.

In the illustrative embodiments each of the rollers 154 is individually powered by a stepper motor 158. This motorized arrangement, along with the appropriate controls 160, offers the greatest flexibility in controlling the rollers 154 to provide an intelligent zero pressure accumulation conveyor with flexible zone size capability, such as is described in detail in U.S. Pat. Nos. 6,460,683 and 6,729,463 which are assigned to the present assignee. In the illustrative embodiments the opposing rollers 156 are idler rollers, or in other words they are free wheeling rollers. In alternative equivalent embodiments, fewer than all of the rollers 154 can be powered, and some or all of the rollers 156 can be powered. It will be noted that the rollers 154, 156 also have stepped diameters for handling different size pallets supporting the drive 100 and/or its component parts.

Figure 6:
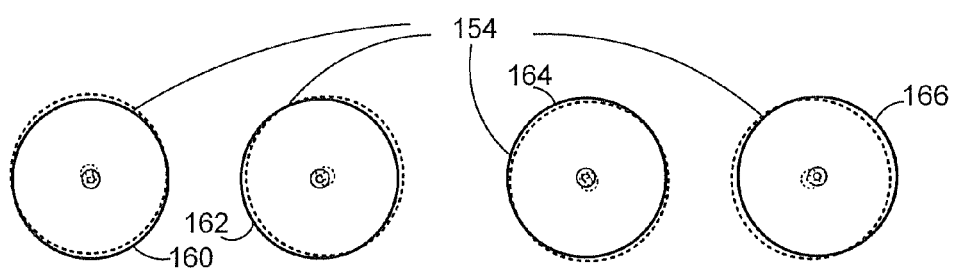
FIG. 6 is a view taken along the line depicted in FIG. 3, showing that consecutive rollers preferably rotate non-synchronously.

Preferably, consecutive powered rollers 154 rotate nonsynchronously. For example, FIG. 6 depicts four consecutive rollers 154 wherein the eccentricity (depicted by solid circles) defines maximums located at about the five-o'clock position 160, eight-o'clock position 162, eleven-o'clock position 164, and two-o'clock position 166, respectively. This ensures that a drive 100 will be subjected to rocking forces in the longitudinal direction as well as in the lateral direction, as depicted previously in FIGS. 4 and 5. Testing performed during reduction to practice of the present embodiments concluded that a useful vibration waveform from the rocker conveyor 146 is characterized by a frequency less than about 20 Hz and peak-to-peak amplitude less than about 10 G (G=9.81 meter/second$^2$).

Figure 7:
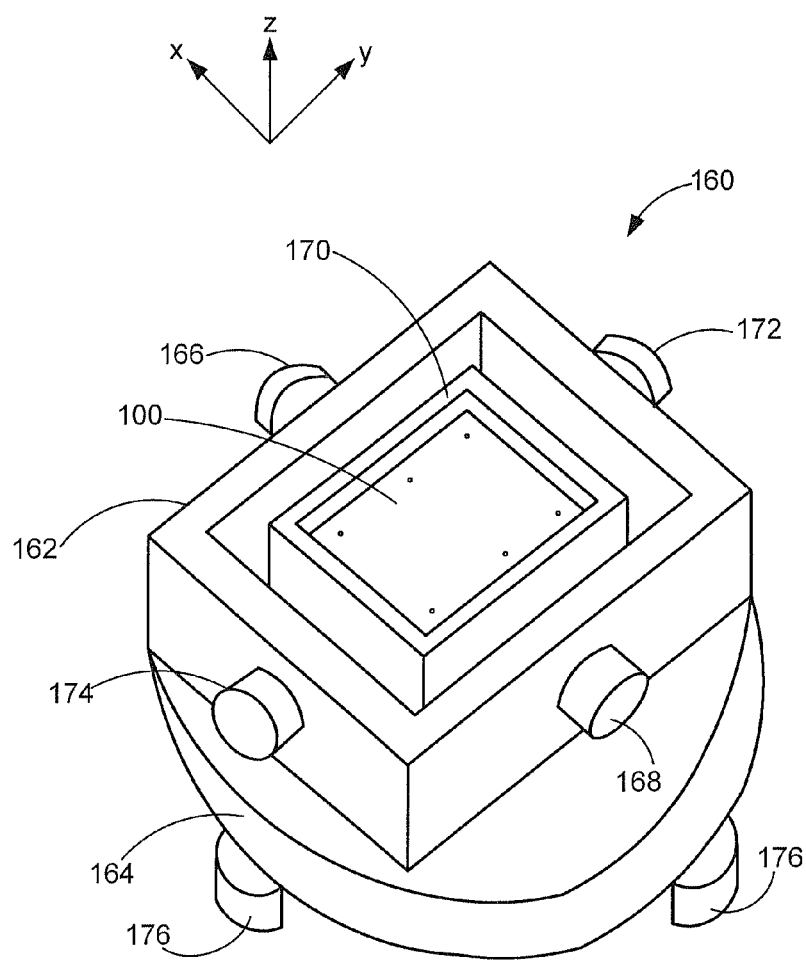
FIG. 7 is an isometric view of a flipping system suited for use in the flipping station of the present embodiments.

The handling apparatus of the present embodiments further contemplates the rocker conveyor 146 delivering the drive 100 to a flipping station that is capable of supportingly engaging the drive 100 and rotating it around a selected one or more of the drive 100 lateral axis, longitudinal axis, and transverse axis. The flipping station can be incorporated as the working part of a cell, much like the tool arrangement 142 in the cell 140 depicted in FIG. 2. Alternatively, the flipping station can be incorporated into a portion of conveyor between cells. FIG. 7 depicts a three-axis flipping system 160 suited for use in either type of flipping station, either in a cell or between cells.

Figure 8:
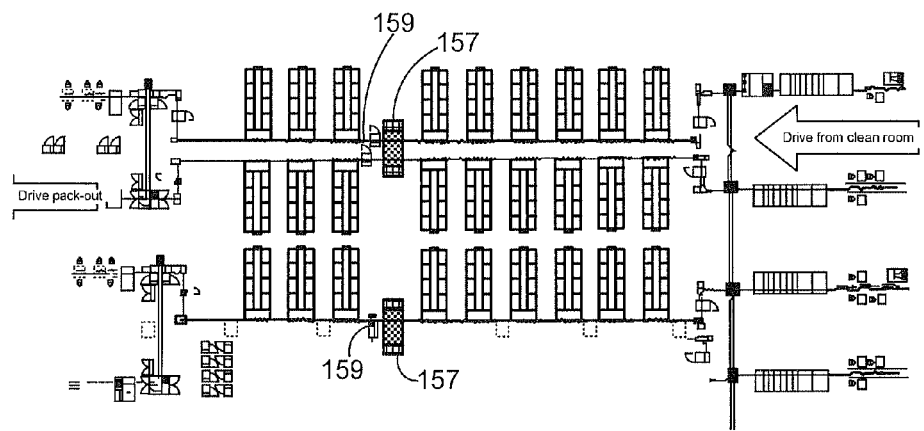
FIG. 8 is a diagrammatic view of a manufacturing system for the device of FIG. 1, depicting a rocking station and a flipping station located just before final testing operations.

FIG. 8 diagrammatically depicts illustrative embodiments wherein a rocker conveyor station 157 and a flipping station 159 are positioned for handling the drives 100 at the back end of the drive 100 manufacturing system, within the sequencing of the drives 100 in test ovens just before final testing. In this arrangement the rocker conveyor station 157 employed a rocker conveyor 146 about ten meters in length, and the flipping station 159 employed a flipping routine described below with regard to FIG. 9.

Returning now to FIG. 7, the flipping system 160 has a frame 162 that is rotationally positionable upon a base 164 around the z-axis, referred to herein as rotation around the transverse axis. The frame 162 supports a pair of opposing clamps 166, 168 that selectively engage and rotate a fixture 170 around the x-axis, referred to herein as rotation around the lateral axis. In a similar manner, the frame 162 supports a pair of opposing clamps 172, 174 that selectively engage and rotate the fixture 170 around the y-axis, referred to herein as rotation around the longitudinal axis. The fixture 170 is sized to receivingly engage and fix the drive 100 for rotation.

The base 164 can be mounted as a floating stage upon solenoids 176 (only two shown) that function as a vibratory system for further enhancing the agitation while flipping the drive 100. It was determined during experimentation that a useful vibration waveform from the vibratory system is characterized by a frequency less than about 5 kHz and peak-to-peak amplitude less than about 5 G.

Figure 9:
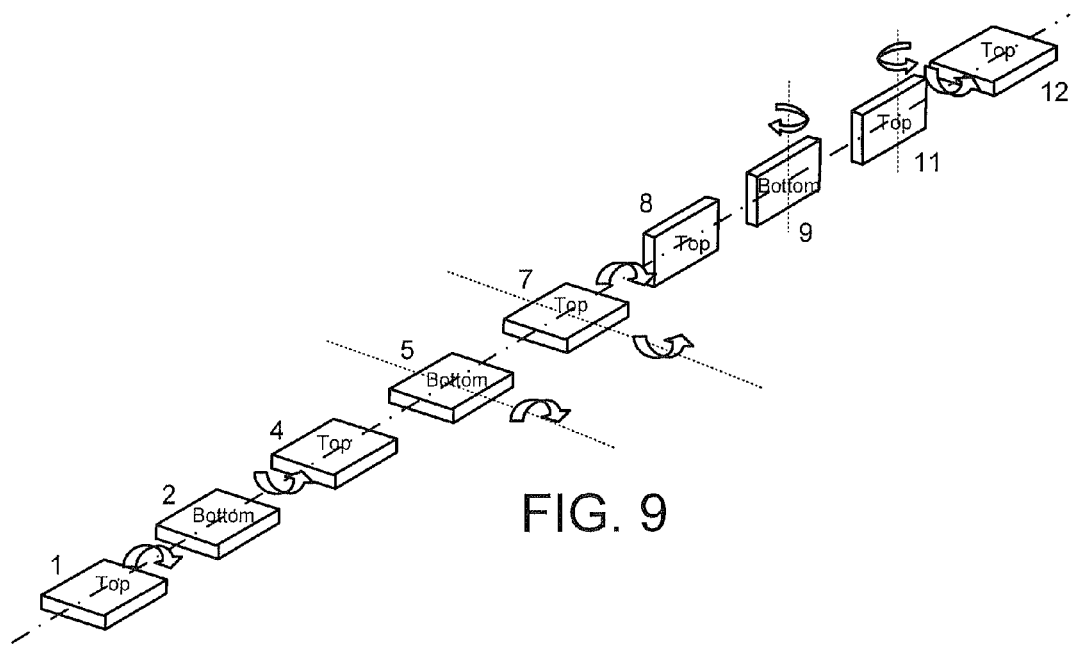
FIG. 9 diagrammatically depicts a step-by-step flipping routine for the flipping station of FIG. 8 in accordance with embodiments of the present invention.

FIG. 9 depicts a step-by-step flipping routine that was found to be particularly effective in dislodging debris from the dead zones. The routine begins and ends, at steps 1 and 12 respectively, with the drive 100 in an upstanding orientation as it otherwise travels down the conveyor 146 during manufacturing. From step 1 to step 2 the drive 100 is rotated 180 degrees in a clockwise direction (as indicated by the arrow) around the lateral axis. This and all other rotations are performed within an interval of about 0.4 seconds. After step 2 a dwell of about 0.4 seconds is performed, and then the drive 100 is rotated 180 degrees in a counterclockwise direction around the lateral axis in step 4.

The drive 100 is again rotated clockwise 180 degrees around the lateral axis in step 5. Another dwell for about 0.4 seconds is performed, and then the drive 100 is again rotated 180 degrees around the lateral axis in the counterclockwise direction in step 7. The drive 100 is then rotated 90 degrees clockwise around the longitudinal axis in step 8, and then rotated 180 degrees clockwise around the transverse axis in step 9. In step 11 the drive 100 is rotated back 180 degrees counterclockwise around the transverse axis, and then finally the drive 100 is rotated 90 degrees counterclockwise around the longitudinal axis in step 12.

After the rocker conveyor station 157 and flipping station 159 have handled the drive 100 in the manner described above, a subsequent cell receivingly engages the drive 100 and powers the motor 105 in order to spin the disc 108 to perform the self-purging routine. The dislodged debris in the enclosure is more likely to be transferred to the filter 132 during the self-purging routine, and more likely to be transferred in a shorter amount of time, as a result of practicing embodiments of the present invention.

Generally, the illustrative embodiments disclosed above with respect to the drive 100 contemplate a manufacturing system having an assembly of data storage device components at a selected step of a manufacturing process, and means for handling the assembly to enhance a self-purge efficiency with which debris that exists in the assembly is ameliorated. For purposes of the present description and meaning of the appended claims, the phrase "means for handling" covers the disclosed structure and equivalents thereof that are capable of imparting a vibration waveform in terms of a selected frequency pulse width and a selected amplitude that effectively dislodges debris from the drive 100 without adversely affecting the functionality of the drive 100.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary in type or arrangement without departing from the spirit and scope of the present invention.

In addition, although the embodiments described herein are directed to machine cells in a manufacturing system, it will be appreciated by those skilled in the art that the claimed subject matter is not so limited and various other systems can utilize the present embodiments without departing from the spirit and scope of the claimed invention.

What is claimed is:

1. A device handling apparatus comprising opposing rails supporting respective rows of cantilevered eccentric rollers defining a rocker conveyor path for the device, wherein the rollers supported by one rail of the opposing rails are clearingly disengaged from the rollers supported by the other rail of the opposing rails, and wherein the device while traversing the rocker conveyor path is repeatedly reciprocated between a positive rotation and a negative rotation with respect to a substantially horizontal reference plane due to cooperative locations of supporting surfaces of each of a first set and a second set, respectively, of opposing pairs of the eccentric rollers.

2. The apparatus of claim 1 wherein only one of the rows comprises one or more powered rollers.

3. The apparatus of claim 2 wherein one of the rows is entirely powered rollers and the other of the rows is entirely idler rollers.

4. The apparatus of claim 1 comprising nonsynchronous consecutive powered rollers.

5. A device handling apparatus comprising:
a rocker conveyor comprising opposing rails supporting respective rows of cantilevered eccentric rollers, wherein the rollers supported by one rail of the opposing rails are clearingly disengaged from the rollers supported by the other rail of the opposing rails, and wherein the device is operably supported by one or more of the rollers supported by the one rail and one or more of the rollers supported by the other rail; and
a flipping station capable of supportingly engaging the device and rotating it around a selected one or more of the device lateral axis, longitudinal axis, and transverse axis.

6. The apparatus of claim 5 farther comprising a vibratory member capable of operably imparting a vibration to the flipping station.

7. The apparatus of claim 6 capable of handling a moving media data storage device, wherein the rocker conveyor path operably imparts a vibration waveform characterized by a frequency less than about 20 Hz and peak-to-peak amplitude less than about 10 G, and wherein the vibratory member operably imparts a vibration waveform characterized by a frequency less than about 5 kHz and peak-to-peak amplitude less than about 5 G.

8. The apparatus of claim 5 capable of dislodging debris from a moving media data storage device, wherein the flipping station is capable of rotating the data storage device as much as 180 degrees in any of the lateral axis, longitudinal axis, and transverse axis in less than 0.5 seconds.

9. The apparatus of claim 5 capable of dislodging debris from a moving media data storage device, further comprising a self-purging station capable of receivingly engaging the data storage device and spinning the media after the data storage device has been handled by at least one of the rocker conveyor and the flipping station.

10. A method for handling a device comprising:
rocking the device along a rocker conveyor path defined by opposing rails supporting respective rows of cantilevered eccentric rollers, wherein the rollers supported by one rail of the opposing rails are clearingly disengaged from the rollers supported by the other rail of the opposing rails, and wherein the device is instantaneously supported by one or more of the rollers supported by the one rail and one or more of the rollers supported by the other rail; and
flipping the device around a selected one or more of the device lateral axis, longitudinal axis, and transverse axis.

11. The method of claim 10 wherein the rocking step comprises powering rollers within only one of the rows of rollers.

12. The method of claim 11 wherein the rocking step comprises powering all the rollers in one of the rows of rollers.

13. The method of claim 10 wherein the rocking step comprises rotating consecutive powered eccentric rollers nonsynchronously.

14. The method of claim 10 further comprising vibrating the device during the flipping step.

15. The method of claim 14 employed in handling a moving media data storage device, wherein the rocking step is characterized by a vibration waveform frequency less than about a 20 Hz frequency and peak-to-peak amplitude less than about 10 G, and wherein the vibrating step is characterized by a vibration waveform frequency less than about a 5 kHz frequency and a peak-to-peak amplitude less than about 5 G.

16. The method of claim 10 employed in handling a moving media data storage device, wherein the flipping step comprises rotating the data storage device as much as 180 degrees in any one of the lateral axis, longitudinal axis, and transverse axis in less than about 0.5 seconds.

17. The method of claim 10 employed in handling a moving media data storage device, wherein the flipping step comprises flipping the data storage device at least once around each of the lateral axis, longitudinal axis, and transverse axis.

18. The method of claim 10 employed in handling a moving media data storage device, further comprising powering the data storage device to rotate the media after the rocking and flipping steps.

* * * * *